(12) United States Patent
Imamura et al.

(10) Patent No.: US 12,344,253 B2
(45) Date of Patent: Jul. 1, 2025

(54) HYBRID VEHICLE SYSTEM

(71) Applicant: Mazda Motor Corporation, Hiroshima (JP)

(72) Inventors: Yasumasa Imamura, Aki-gun (JP); Juntaro Matsuo, Aki-gun (JP); Daisuke Umetsu, Aki-gun (JP); Kohei Okada, Aki-gun (JP); Junichi Kubo, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 303 days.

(21) Appl. No.: 18/190,845

(22) Filed: Mar. 27, 2023

(65) Prior Publication Data

US 2023/0398992 A1    Dec. 14, 2023

(30) Foreign Application Priority Data

Jun. 14, 2022    (JP) ................. 2022-096097

(51) Int. Cl.
   *B60W 30/182*   (2020.01)
   *B60W 10/06*    (2006.01)
   *B60W 10/08*    (2006.01)
   *B60W 20/10*    (2016.01)
   *B60W 50/08*    (2020.01)

(52) U.S. Cl.
   CPC .......... *B60W 30/182* (2013.01); *B60W 10/06* (2013.01); *B60W 10/08* (2013.01); *B60W 20/10* (2013.01); *B60W 50/082* (2013.01); *B60W 2710/083* (2013.01)

(58) Field of Classification Search
   CPC ...... B60W 10/06; B60W 10/08; B60W 20/10; B60W 30/182; B60W 50/082; B60W 2710/083
   USPC ........................................... 701/22
   See application file for complete search history.

(56) References Cited

U.S. PATENT DOCUMENTS

| | | | |
|---|---|---|---|
| 6,295,487 B1 | 9/2001 | Ono et al. | |
| 7,792,628 B2* | 9/2010 | Aswani | B60W 50/06 903/902 |
| 9,409,566 B2* | 8/2016 | Wang | B60W 10/105 |
| 2019/0168770 A1* | 6/2019 | Arai | B60W 10/06 |
| 2023/0383837 A1* | 11/2023 | Maehara | F16H 61/0213 |

FOREIGN PATENT DOCUMENTS

JP    2010143579 A    7/2010

* cited by examiner

*Primary Examiner* — Andrew Joseph Rudy
(74) *Attorney, Agent, or Firm* — Alleman Hall & Tuttle LLP

(57) ABSTRACT

A hybrid vehicle system is configured to be capable of switching among four or more of a plurality of traveling modes including a hybrid electric vehicle (HEV) mode and an electric vehicle (EV) mode, and includes one toggle switch for selecting any one of the plurality of traveling modes and a controller. The controller selects the plurality of traveling modes in sequence whenever the toggle switch accepts each of operations to a first direction and a second direction. The HEV mode is set to be changed to different traveling modes between when the toggle switch accepts one or a plurality of operations to the first direction and when the toggle switch accepts an operation to the second direction, and the HEV mode and the EV mode are set to be continuous in an order of selection by the controller.

6 Claims, 14 Drawing Sheets

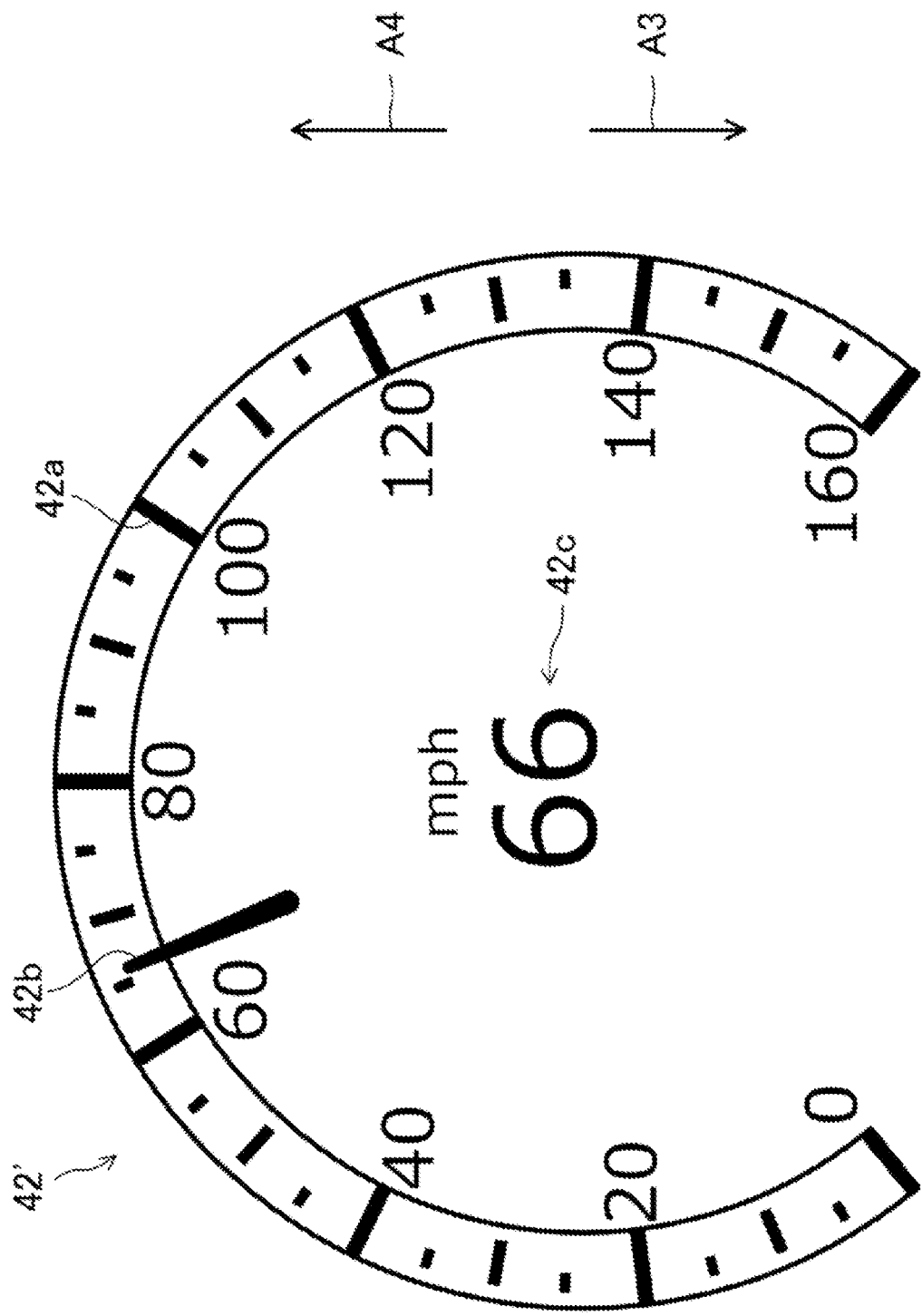

HYBRID VEHICLE SYSTEM

TECHNICAL FIELD

The present disclosure relates to a hybrid vehicle system.

BACKGROUND ART

For example, JP2010-143579 discloses a hybrid vehicle capable of switching between an HEV (hybrid electric vehicle) mode of outputting a driving force of an engine or driving forces of both the engine and a motor and an EV (electric vehicle) mode of outputting the driving force of the motor only.

Specifically, the hybrid vehicle disclosed in JP2010-143579 includes a rocker switch for the switching between the HEV mode and the EV mode. According to JP2010-143579, providing such a rocker switch can further ensure the selective switching between the HEV mode and the EV mode.

SUMMARY OF THE INVENTION

Problem to be Solved by the Invention

The rocker switch described in JP2010-143579 is applicable to a hybrid vehicle selectively switching between two traveling modes, such as between the HEV mode and the EV mode described above.

However, such a rocker switch cannot be applicable to a vehicle capable of switching among four or more traveling modes, such as a case, for example, where the traveling modes include not only the HEV mode and the EV mode but also a sport mode and a towing mode.

To address the problem, a so-called toggle switch might be used as an alternative to the rocker switch. Considering the frequency of each traveling mode, however, it is still necessary to improve the operability performance of the toggle switch.

The present disclosure has been made in light of these respects. An object of the disclosure is to improve operability during switching among traveling modes in a hybrid vehicle system capable of switching among four or more traveling modes.

Means for Solving the Problem

The present disclosure relates to a hybrid vehicle system configured to be capable of switching among four or more of a plurality of traveling modes including an HEV (hybrid electric vehicle) mode in which an engine and a motor output traveling torque and an EV (electric vehicle) mode in which only the motor outputs the traveling torque, and including one operation device for selecting any one of the plurality of traveling modes. This hybrid vehicle system includes a controller electrically connected to the operation device, the operation device is configured by a toggle switch that accepts one or a plurality of operations to a predetermined first direction and one or a plurality of operations to a second direction different from the first direction and configured to output a signal corresponding to each operation to the controller, and the controller selects the plurality of traveling modes in sequence whenever the operation device accepts each of the operations to the first direction and the second direction.

Furthermore, according to the present disclosure, the HEV mode is set to be changed to different traveling modes between when the operation device accepts the one or plurality of operations to the first direction and when the operation device accepts the one or plurality of operations to the second direction, and the HEV mode and the EV mode are set to be continuous in an order of selection by the controller.

According to this configuration, the one or plurality of operations to the toggle switch serving as the operation device can switch the HEV mode to one of the three or more other traveling modes. The use of the toggle switch can achieve the switching to each traveling mode without compromising the operability even when four or more traveling modes are set.

Furthermore, according to this configuration, when the operation device accepts the operation to one of the first and second directions, the traveling mode is switched from the HEV mode to the EV mode. When the operation device accepts the operation to the other direction, the traveling mode is switched from the EV mode to the HEV mode. In this way, one operation (a single operation) on the operation device enables mutual transition between the HEV mode and the EV mode. Concerning the switching between these modes, which are estimated to be higher in a frequently of selection than the other traveling modes, the operability during this switching can be improved.

Furthermore, according to one aspect of the present disclosure, the plurality of traveling modes may include a sport mode and a fourth mode, the plurality of traveling modes may be switched by the controller in sequence to change the sport mode to the HEV mode or the HEV mode to the EV mode when the operation device accepts the operation to the first direction, and may be switched by the controller in sequence to change the EV mode to the HEV mode or the HEV mode to the sport mode when the operation device accepts the operation to the second direction, and the fourth mode may be selected by the controller when the operation device accepts the operation to the first direction in the EV mode or when the operation device accepts the operation to the second direction in the sport mode.

According to this configuration, the sport mode is selected when the operation device accepts the single operation in the HEV mode. On the other hand, the fourth mode is selected when the operation device accepts two operations in the HEV mode.

In this way, by setting the number of operations for switching from the HEV mode different depending on the traveling mode, it is possible to set so that the switching from the HEV mode to the sport mode, which is estimated to be high in the frequency of selection similarly to the EV mode, is performed immediately and that the fourth mode, which is estimated to be low in the frequency of selection, is not selected by the single operation. This can improve the operability during the switching among the modes.

That is, configuring the operation device with the toggle switch can set the different number of operations required for the selection, depending on the frequency of selection of each traveling mode. This can realize smoother switching for the traveling modes with a high frequency of selection while inhibiting a selection error resulting from a malfunction for the traveling modes with a low frequency of selection. This is advantageous in improving the operability of the operation device.

Furthermore, according to one aspect of the present disclosure, the hybrid vehicle system may include a startup mode setting device that is configured as a separate component from the toggle switch and that can set the EV mode to be selected during vehicle startup, and the controller may preferentially select the HEV mode over the EV mode during the vehicle startup when the startup mode setting device does not make any settings, and may preferentially select the EV mode over the HEV mode during the vehicle startup when the startup mode setting device makes settings.

According to this configuration, it is possible to realize the startup from the EV mode without setting the HEV mode as a starting point during the vehicle startup. This enables more flexible settings in response to a driver's request.

Furthermore, according to one aspect of the present disclosure, the startup mode setting device may be adjacent to the toggle switch across a shift lever.

According to this configuration, the startup mode setting device is disposed closer to the shift lever and proximate to the toggle switch. Disposing the startup mode setting device and the toggle switch proximately enables improved operability during settings by the startup mode setting device.

Advantage of the Invention

As described so far, according to the present disclosure, it is possible to improve the operability during switching among traveling modes in the hybrid vehicle system capable of switching among four or more traveling modes.

BRIEF DESCRIPTION OF THE DRAWINGS

FIG. 10A is a diagram illustrating a modification of the second meter display device and corresponding to FIG. 5.

MODES FOR CARRYING OUT THE INVENTION

Embodiments of the present disclosure will be described hereinafter with reference to the drawings. The following descriptions are given by way of example.
(Overall Configurations)

Figure 1:
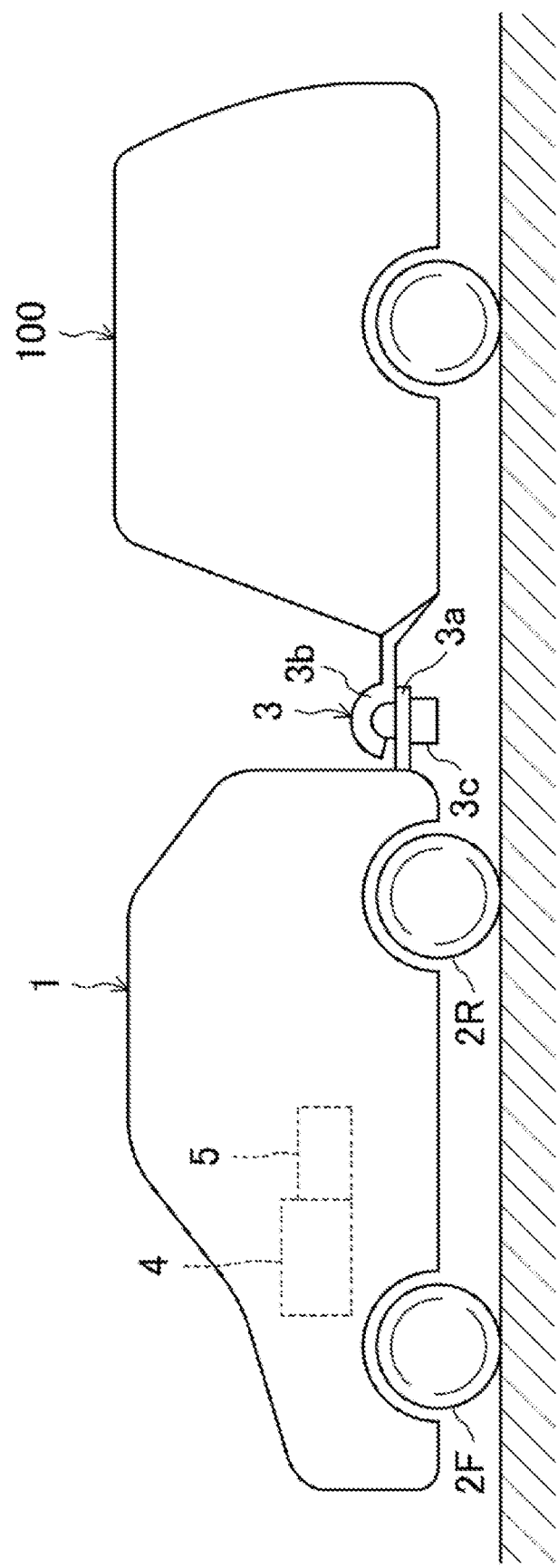
FIG. 1 is a diagram illustrating a hybrid vehicle and a towing state of the hybrid vehicle.

FIG. 1 illustrates a motor vehicle 1 (an example of a hybrid vehicle) according to the present embodiment and a towing state of the motor vehicle 1. The motor vehicle 1 illustrated in FIG. 1 is a hybrid vehicle capable of traveling using electricity. This motor vehicle 1 configures a hybrid vehicle system according to the present embodiment. The motor vehicle 1 also has front wheels 2F and rear wheels 2R, i.e., four wheels in total.

The motor vehicle 1 is a so-called four-wheel drive vehicle. The motor vehicle 1 serving as the four-wheel drive vehicle can tow another vehicle (towed vehicle). The motor vehicle 1 includes a coupling device 3 for towing.

As illustrated in FIG. 1, the coupling device 3 is disposed in a rear portion of the motor vehicle 1. A trailer 100 as the towed vehicle is coupled to the motor vehicle 1 via this coupling device 3.

More specifically, the coupling device 3 is configured with a hitch member 3a provided in the rear portion of the motor vehicle 1 and a coupler 3b provided in a front portion of the trailer 100. The coupler 3b is formed so that the coupler 3b can be coupled to the hitch member 3a. The hitch member 3a is provided with a towing sensor 3c that detects a towing state of the motor vehicle 1.

The towing sensor 3c is configured with a current sensor. The towing sensor 3c outputs an ON signal when the motor vehicle 1 is in the towing state and outputs an OFF signal when the motor vehicle 1 is in a non-towing state (a state in which the motor vehicle 1 is not towing the towed vehicle).

Figure 2:
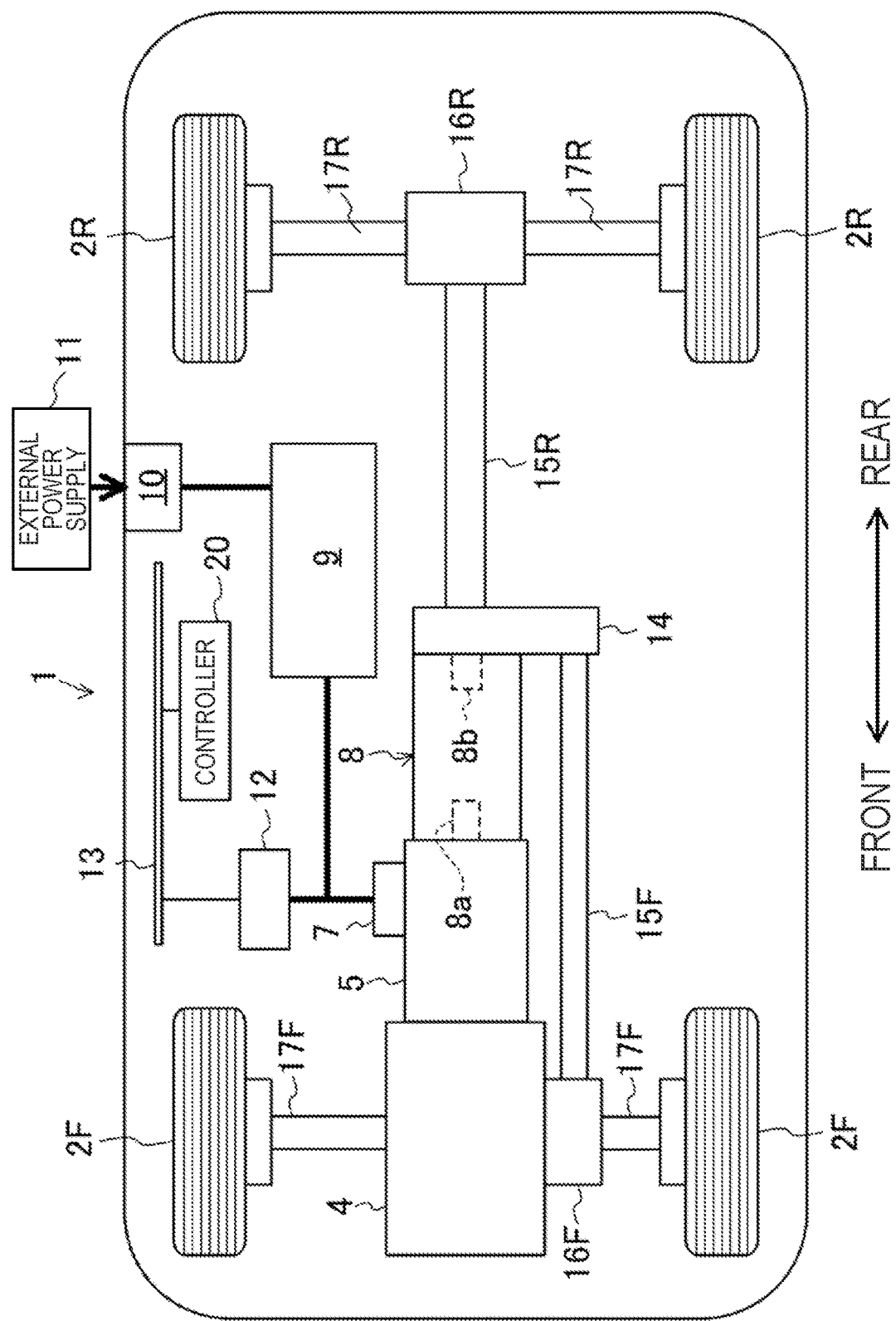
FIG. 2 is a diagram illustrating details of the hybrid vehicle.

FIG. 2 illustrates details of the motor vehicle 1. It is noted that in the following descriptions, "front/forward" means "front/forward" in a front-rear direction of a vehicle body of the motor vehicle 1 unless specified otherwise. Likewise, "rear/rearward" means "rear/rearward" in the front-rear direction of the vehicle body of the motor vehicle 1 unless specified otherwise.

In addition, "left" and "right" are both in a direction along a vehicle width direction. Particularly in the following descriptions, "left" means "left" in a view from a rear side to a front side along the front-rear direction of the vehicle body. Likewise, "right" means "right" in a view from the rear side to the front side along the front-rear direction of the vehicle body.

Furthermore, "upper/upward" and "lower/downward" are both in a direction along a height direction of the vehicle body of the motor vehicle (vehicle height direction) unless specified otherwise.

As drive sources, an engine 4 and a motor 5 are onboard this motor vehicle 1. These work together to drive the front wheels 2F and the rear wheels 2R. These drive the motor vehicle 1 to run. Furthermore, the motor 5 can be used not only as the drive source but also as an electric generator during regeneration.

A high-voltage battery 9 is onboard the motor vehicle 1. The electricity is supplied to the motor 5 from the high-voltage battery 9, and the motor 5 generates torque used for the motor vehicle 1 to run. An external power supply 11 is connected to the high-voltage battery 9 via a power feed port 10. The high-voltage battery 9 is charged by the external power supply 11. The motor vehicle 1 is a so-called plug-in hybrid vehicle. It is noted that the motor vehicle 1 may be a hybrid vehicle excluding the power feed port 10.

As devices in a drivetrain, an inverter 7 and an automatic transmission 8, as well as the engine 4 and the motor 5, are onboard the motor vehicle 1. A controller 20 as a device in a control system is also onboard the motor vehicle 1.
(Devices in Drivetrain)

The engine 4 is, for example, an internal combustion engine that burns a fossil fuel. The engine 4 is a so-called four-cycle engine. In this motor vehicle 1, the engine 4 is disposed in a nearly central portion in the vehicle width direction in a state in which a crankshaft, not illustrated, of the engine 4 is oriented to the front-rear direction of the vehicle body.

The motor 5 is a permanent magnet-type synchronous motor driven by a three-phase alternating current. The motor 5 is disposed in the rear of the engine 4 in series. The motor 5 is also disposed in front of the automatic transmission 8 in series. The engine 4 is coupled to the automatic transmission 8 via the motor 5. A rear end portion of the motor 5 is coupled to an input shaft 8a of the automatic transmission 8.

The motor 5 is connected to the high-voltage battery 9 via the inverter 7. The inverter 7 converts direct-current electric power supplied from the high-voltage battery 9 into three-phase alternating current electric power to energize the motor 5. The motor 5 is thereby driven to rotate. Furthermore, the motor 5 supplies regenerative energy to the high-voltage battery 9.

The high-voltage battery 9 is also connected to a DC-DC converter 12. The DC-DC converter 12 converts high-voltage direct-current electric power into low-voltage direct-current electric power of 12V and outputs the low-voltage direct-current electric power. The DC-DC converter 12 is connected to a low-voltage battery (so-called lead storage battery), not illustrated.

The DC-DC converter 12 is also connected to a CAN (Controlled Area Network) 13. The DC-DC converter 12 thereby supplies the low-voltage direct-current electric power to the CAN 13.

The automatic transmission 8 is a so-called multi-stage automatic transmission (so-called AT). The automatic transmission 8 has the input shaft 8a in a front end portion of the automatic transmission 8 and the input shaft 8a is coupled to the motor 5 as described above. The automatic transmission 8 has an output shaft 8b provided in a rear end portion of the automatic transmission 8 and rotated independently of the input shaft 8a. A transmission mechanism including a plurality of planetary gear mechanisms, a plurality of friction clutch elements, and the like is incorporated between the input shaft 8a and the output shaft 8b.

As illustrated in FIG. 2, the output shaft 8b of the automatic transmission 8 is coupled to a transfer case 14. This transfer case 14 is coupled to a rear propeller shaft 15R and a front propeller shaft 15F. Rotational power output through the output shaft 8b is distributed by the transfer case 14 to the rear propeller shaft 15R and the front propeller shaft 15F.

The rear propeller shaft 15R extends in the front-rear direction of the vehicle body and is coupled to a rear differential gear 16R. This rear differential gear 16R is coupled to a pair of rear drive shafts 17R, 17R extending in the vehicle width direction. The pair of rear drive shafts 17R, 17R are coupled to the left and right rear wheels 2R, 2R, respectively. The rotational power output through the rear propeller shaft 15R is distributed by the rear differential gear 16R and then transmitted to the rear wheels 2R through the pair of rear drive shafts 17R, 17R, respectively.

The front propeller shaft 15F extends forward in the front-rear direction of the vehicle body while passing by sides of the automatic transmission 8 and the motor 5. The front propeller shaft 15F is coupled to a front differential gear 16F. This front differential gear 16F is coupled to a pair of front drive shafts 17F, 17F extending in the vehicle width direction. The pair of front drive shafts 17F, 17F are coupled to the left and right front wheels 2F, 2F, respectively. The rotational power output through the front propeller shaft 15F is distributed by the front differential gear 16F and then transmitted to the front wheels 2F through the pair of front drive shafts 17F, 17F, respectively.

The devices in the drivetrain are controlled by the controller 20 connected to the DC-DC converter 12 via the CAN 13. This controller 20 controls the motor vehicle 1 to travel by inputting control signals to the devices in the drivetrain. The controller 20 can not only control the motor vehicle 1 to travel but also switch traveling modes of the motor vehicle 1 such as switching between traveling using both the engine 4 and the motor 5 and traveling using the motor 5 only.

Particularly in the present embodiment, the motor vehicle 1 is switchable among four or more, i.e., a plurality of traveling modes including an HEV mode and an EV mode. The HEV mode is a Hybrid Electric Vehicle mode. The HEV mode is the traveling mode in which both the engine 4 and the motor 5 output torque for the motor vehicle 1 to run. The EV mode is an Electric Vehicle mode. The EV mode is the traveling mode in which only the motor 5 outputs torque for the motor vehicle 1 to run.

It is noted that the HEV mode is the traveling mode estimated to be used more frequently than the other traveling modes. In the following descriptions, this HEV mode may be referred to as "normal mode."

The plurality of traveling modes include a sport mode, a towing mode, an off-road mode as well as the HEV mode and the EV mode. The towing mode and the off-road mode are each an example of a "fourth mode" in the present embodiment.

The sport mode is set to make a target acceleration of the motor vehicle 1 higher during the depression of an accelerator pedal than the normal mode. The sport mode is also set to use low-speed gear positions more frequently than the normal mode. In the sport mode, the devices in the drivetrain are controlled to follow up a driver's aggressive intention to "further accelerate the vehicle."

The towing mode is set to make a brake force higher during the depression of a brake pedal than the normal mode, reduce drive torque of the engine 4 at the beginning of turning, and distribute more torque to the rear wheels 2R, or generate the brake force in the front wheels 2F for inhibiting rolling of the trailer 100. In the towing mode, the devices in the drivetrain are controlled to realize the traveling suited for the traveling of the motor vehicle 1 in the towing state.

The off-road mode is set to use the low-speed gear positions more frequently than the normal mode and less frequently than the sport mode. The off-road mode is also set to distribute the torque to the front wheels 2F and the rear wheels 2R uniformly and distribute the brake force to the front wheels 2F and the rear wheels 2R uniformly, compared with the normal mode. In the off-road mode, the devices in the drivetrain are controlled to enhance traction performance so that the motor vehicle 1 can handle the traveling on a rough road.

To realize switching among those traveling modes, the motor vehicle 1 includes one operation device to select one from the plurality of traveling modes. That is, in the present embodiment, it is designed to realize the switching among the traveling modes not by a combination of a plurality of operation devices but by the single operation device. The operation device generates an electrical signal corresponding to an operation performed by an occupant and outputs the electrical signal to an outside. The controller 20 is electrically connected to this operation device and executes switching among the traveling modes, to be described later, on the basis of the electrical signal input from the operation device.

Particularly in the present embodiment, the one operation device is configured with a toggle switch 36. This toggle switch 36 is disposed in a cabin 30 of the motor vehicle 1 (refer to FIG. 3 for the cabin 30). In this cabin 30, other devices associated with the traveling modes are also disposed.

(Cabin Internal Structure)

Figure 3:
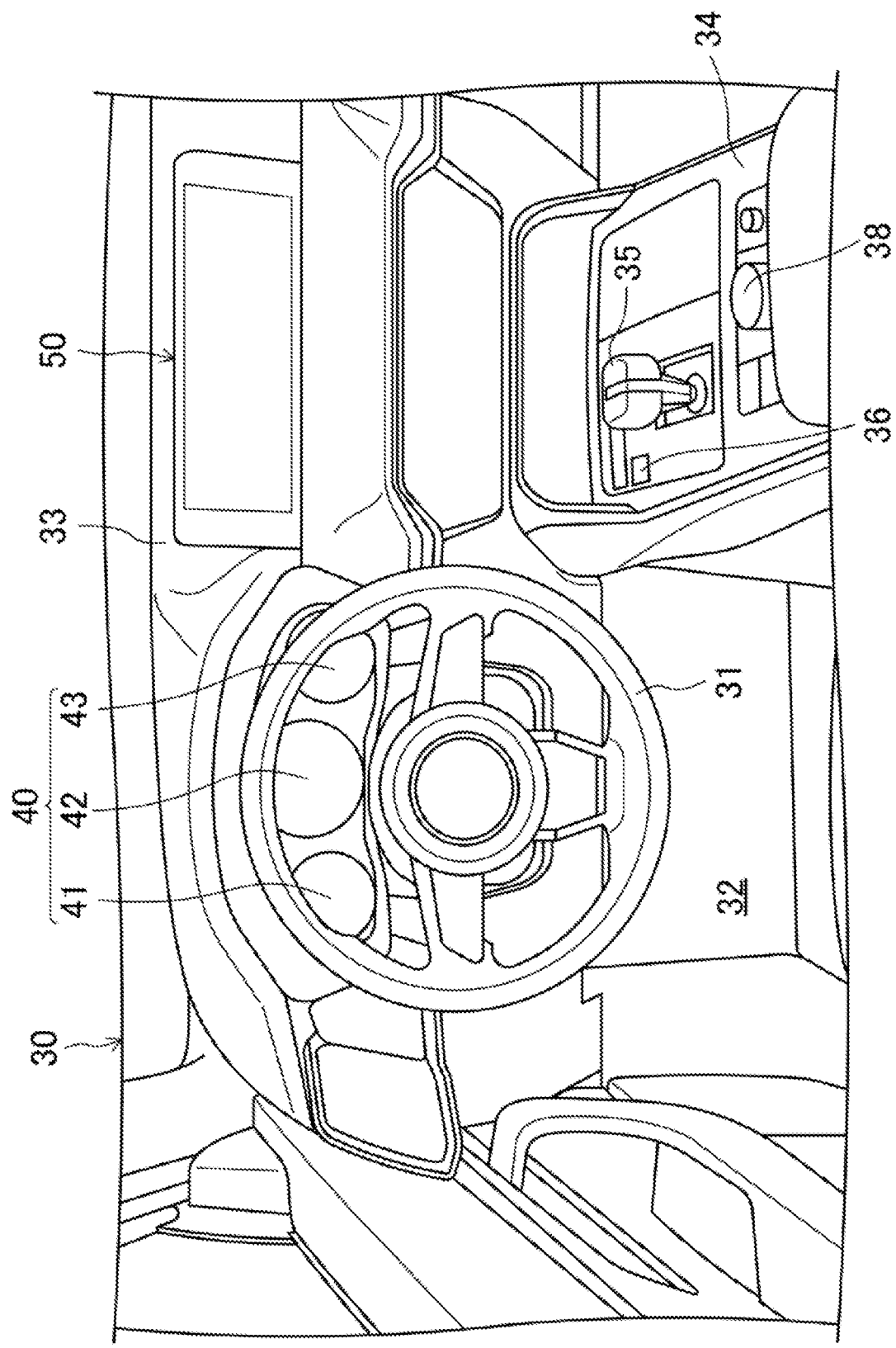
FIG. 3 is a diagram illustrating a cabin of the hybrid vehicle.
Figure 4:
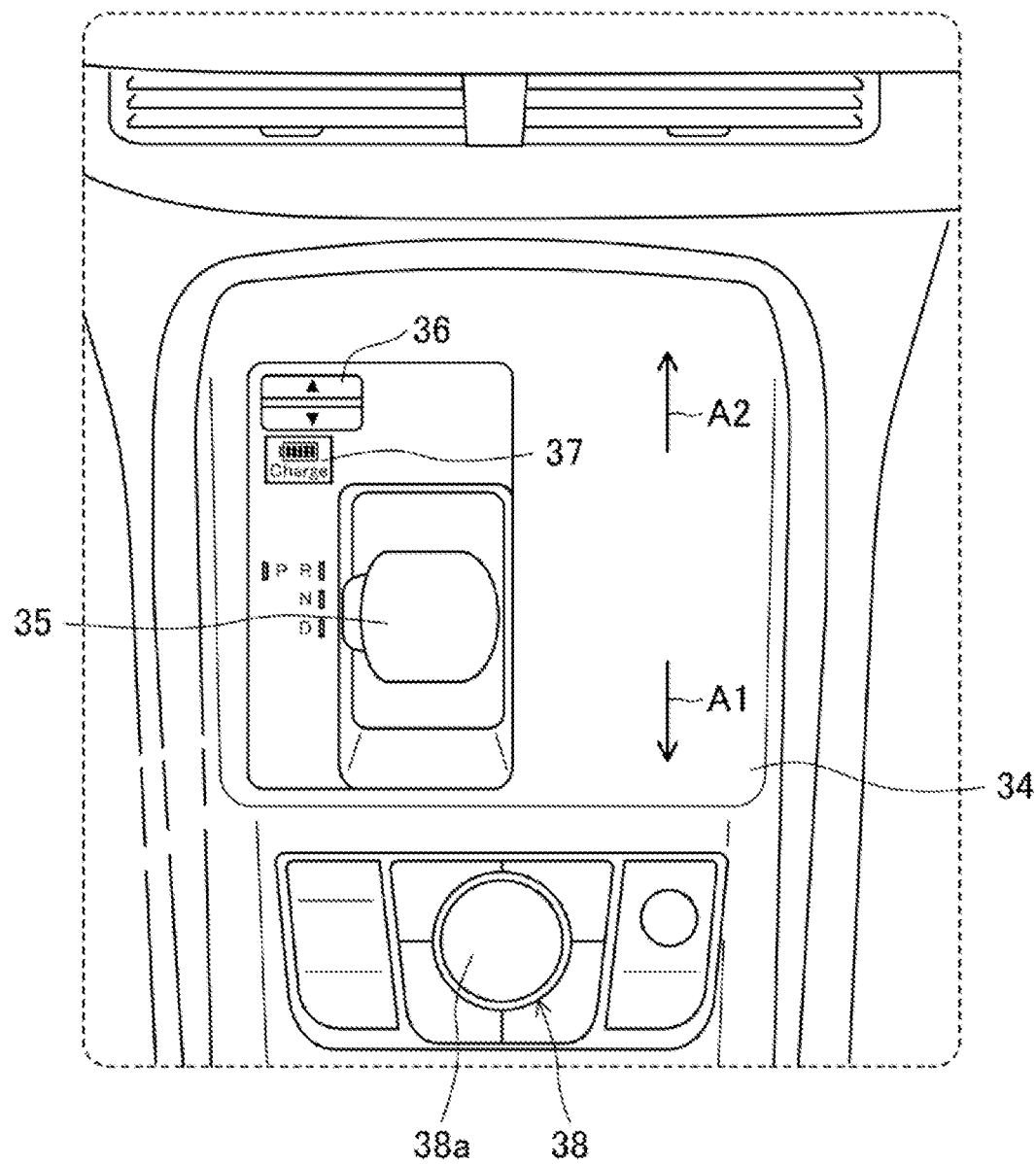
FIG. 4 is a diagram illustrating configurations of a center console.

FIG. 3 illustrates the cabin 30 of the motor vehicle 1. FIG. 4 illustrates configurations of a center console 34. As illustrated in FIG. 3, the motor vehicle 1 is a left-hand drive vehicle with a steering wheel 31 and a driver's seat 32 disposed on the left of the vehicle width direction.

As illustrated in FIG. 3, a dashboard 33 and the center console 34 are disposed in the cabin 30. The dashboard 33 is disposed in a front portion of the cabin 30. The center console 34 is disposed in a nearly central portion in the vehicle width direction of the cabin 30 and extends forward from a right side of the driver's seat 32.

Devices that provide an occupant with information are laid out in and around the dashboard 33. Specifically, as illustrated in FIG. 3, a first display 40 that displays images and the like representing a tachometer is disposed on the left of the dashboard 33 and in front of the steering wheel 31 and the driver's seat 32. In addition, a second display 50 that displays a navigation screen, a setting screen of the motor vehicle 1, and the like is disposed at a center in the vehicle width direction of the dashboard 33 and in front of the center console 34.

On the other hand, various devices, such as a select lever 35, receiving operations of the occupant (mainly, a driver) are laid out in the center console 34. Specifically, as illustrated in FIGS. 3 and 4, the select lever 35 serving as a shift lever, the toggle switch 36 serving as the one operation device, a power meter 37, and a commander switch 38 serving as a startup mode setting device are disposed on a upper surface of the center console 34.

The select lever 35 is an input device for selecting one of shift ranges of the automatic transmission 8. The toggle switch 36 and the power meter 37 are disposed in front of the select lever 35, while the commander switch 38 is disposed in the rear of the select lever 35.

The toggle switch 36 and the power meter 37 are adjacent to the select lever 35 in the front-rear direction, and the select lever 35 is adjacent to the commander switch 38 in the front-rear direction. That is, in the present embodiment, the commander switch 38 is adjacent to the toggle switch 36 across the select lever 35. The commander switch 38 is more proximate to the toggle switch 36 than the steering wheel 31, the first display 40, and the second display 50 to be described later.

The toggle switch 36 is configured to accept both one or a plurality of operations to a predetermined first direction and one or a plurality of operations to a second direction different from this first direction, and to output signals corresponding to the operations to the controller 20. As illustrated by an arrow A1 of FIG. 4, a rearward direction of the front-rear direction of the vehicle body corresponds to the first direction. Likewise, as illustrated by an arrow A2 of FIG. 4, a forward direction of the front-rear direction of the vehicle body corresponds to the second direction.

The toggle switch 36 can tilt in the first or second directions by accepting the driver's operation. For example, when the toggle switch 36 tilts in the first direction (accepts the operation to the first direction), an electrical signal (first electrical signal) corresponding to the action is input to the controller 20. Likewise, when the toggle switch 36 tilts in the second direction (accepts the operation to the second direction), an electrical signal (second electrical signal) corresponding to the action is input to the controller 20.

The toggle switch 36 is configured to return to a non-tilting position (neutral position) when not accepting the driver's operation (during non-operating time). Therefore, the toggle switch 36 according to the present embodiment can be made to repeatedly tilt in the first direction and the second direction. Furthermore, as described later, an indicator 47 (two straight lines illustrated in FIG. 5) in the first display 40 is configured to move synchronously with the tilt of the toggle switch 36.

The power meter 37 is adjacent to the toggle switch 36 and disposed in the rear of the toggle switch 36. The power meter 37 is more proximate to the toggle switch 36 than the select lever 35 and the commander switch 38. The power meter 37 displays a charge status of the high-voltage battery 9. A display content of the power meter 37 can be used as a guide to determine whether to switch the traveling mode.

The commander switch 38 is configured to be rotatable around a central axis that extends in a nearly vertical direction and rockable in the front-rear and horizontal directions. The second display 50 is controlled in response to a rotating action and a rocking action of the commander switch 38. The commander switch 38 has a commander knob 38a in a central portion thereof. This commander knob 38a is configured as a physical button that can be depressed by the occupant. The occupant depressing the commander knob 38a enables the occupant to determine a desired function or the like.

The first display 40 is configured so that at least part of the first display 40 functions as a so-called tachometer and has a display screen for displaying a meter image and the like. This display screen is configured with a liquid crystal display, an organic EL (electroluminescent) display, or the like. A first meter display device 41, a second meter display device (meter display device) 42, and a third meter display device 43 are displayed aligned in sequence from the left side of the vehicle width direction on the display screen of the first display 40.

The first meter display device 41 displays a temperature of an engine coolant, a residual quantity of a fuel, the charge status of the high-voltage battery 9, and the like. The second meter display device 42 displays selection screens for a vehicle velocity, a shift range, and a traveling mode. The third meter display device 43 displays output revolution speeds of the engine 4, the motor 5, and the like. The traveling mode selection screen (traveling mode display device 46) may be displayed on the first meter display device 41 or the third meter display device 43.

Figure 5:
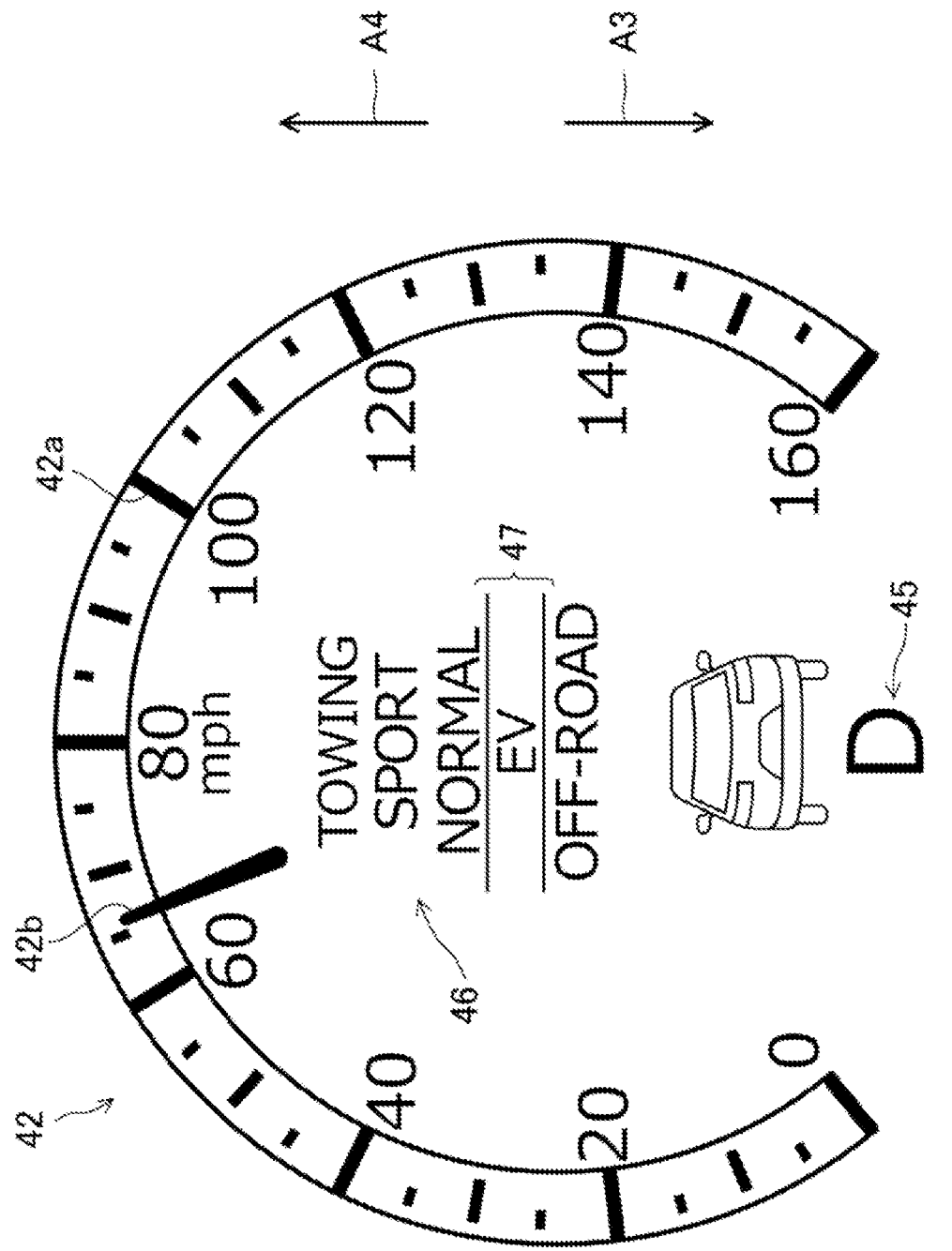
FIG. 5 is a diagram illustrating a second meter display device in a first display.

FIG. 5 illustrates the second meter display device 42 in the first display 40. As illustrated in FIG. 5, the second meter display device 42 displays a scale image 42a and an indicator needle image 42b. The scale image 42a has a plurality of circularly aligned scales. The indicator needle image 42b extends in a needle shape along a radial direction of a circular arc of the scale image 42a. The second meter display device 42 indicates a current vehicle velocity of the motor vehicle 1 based on relative positions of the scale image 42a and the indicator needle image 42b.

A range display device 45 indicating a current shift range is provided on a lower side of the second meter display device 42. As illustrated in FIG. 4, when the select lever 35 selects a D range, "D" is displayed on the range display device 45. When the select lever 35 selects a P range, an R range, or an N range, "P," "R," or "N" is displayed on the range display device 45, respectively.

Furthermore, the traveling mode display device 46 that displays a current traveling mode as well as an operation direction of the toggle switch 36 to be associated with a traveling mode selection order is provided between the scale image 42*a* and the range display device 45. As illustrated in FIG. 5, a plurality of traveling modes are displayed in parallel in the traveling mode display device 46 of the first display 40.

Specifically, the traveling mode display device 46 according to the present embodiment is configured to display a character string "TOWING" corresponding to the towing mode, a character string "SPORTS" corresponding to the sport mode, a character string "NORMAL" corresponding to the normal mode, a character string "EV" corresponding to the EV mode, and a character string "OFF-ROAD" corresponding to the off-road mode in sequence from above.

The traveling mode display device 46 displays the traveling modes other than the normal mode aligned toward upper and lower sides with the character string corresponding to the normal mode as a reference. Specifically, the character strings corresponding to the sport mode and the towing mode are displayed in sequence on the upper side of the normal mode, while the character strings corresponding to the EV mode and the off-road mode are displayed in sequence on the lower side of the normal mode. An order of alignment of the traveling modes on the traveling mode display device 46 is configured to match an order of selection of the traveling modes during an operation of the toggle switch 36.

Furthermore, the traveling mode display device 46 is configured to display two straight lines on and under the character string corresponding to the currently selected traveling mode (traveling mode selected by the controller 20). When the EV mode, for example, is selected, the straight lines are displayed on and under the character string "EV," as illustrated in FIG. 4. The two straight lines move as the traveling mode is switched. The two straight lines function as the indicator 47 that indicates the currently selected traveling mode.

The traveling mode display device 46 moves the indicator 47 in a third direction corresponding to the first direction whenever the toggle switch 36 accepts the operation to the first direction. With this movement, display positions of the indicator 47 move to positions on and under the character string corresponding to each of the towing mode, the sport mode, the normal mode, the EV mode, and the off-road mode.

Figure 8:
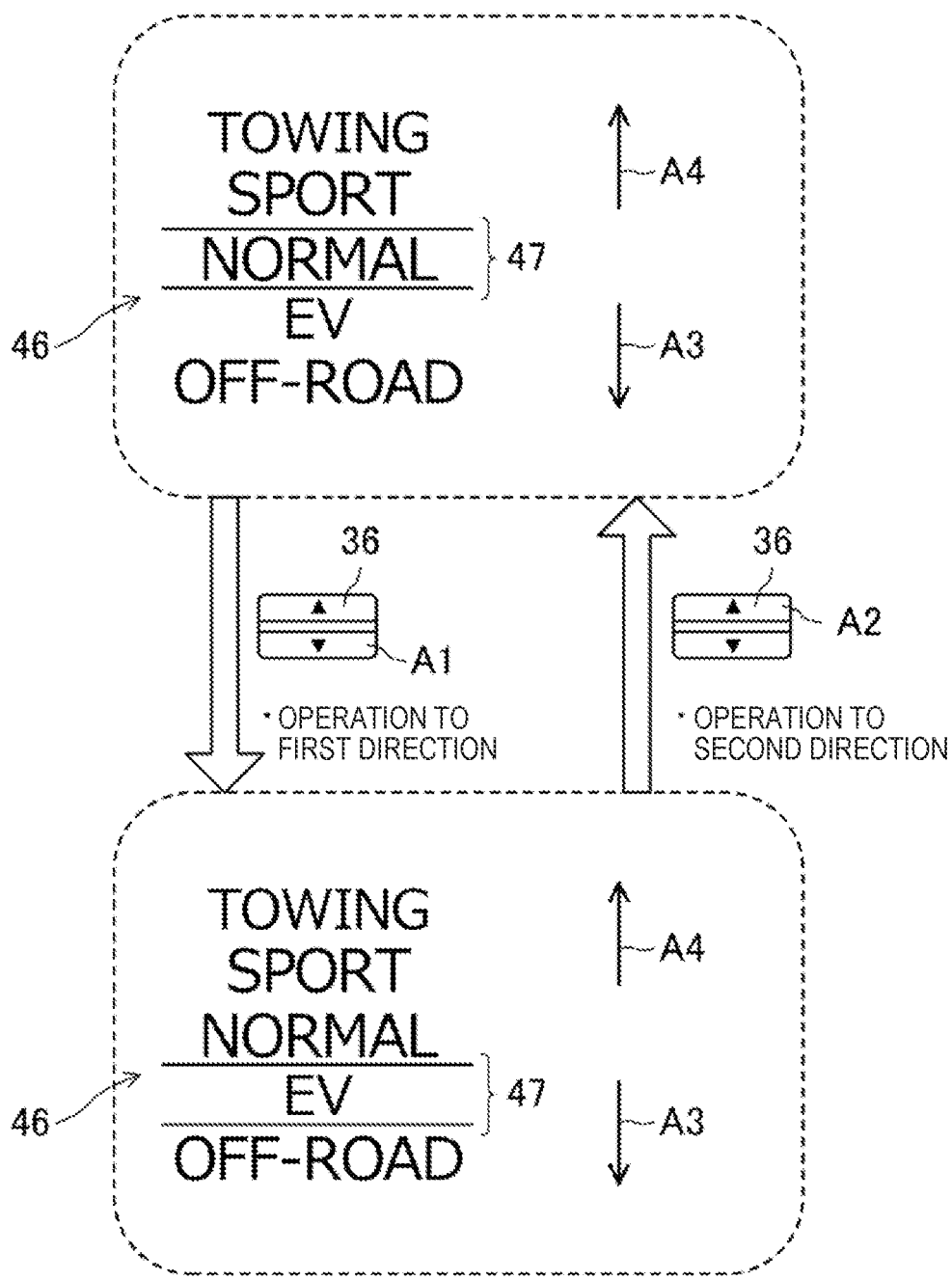
FIG. 8 is an explanatory diagram of settings of a normal mode and an HEV (hybrid electric vehicle) mode.

A moving direction (third direction) of the indicator 47 when the toggle switch 36 is operated to the first direction corresponds to a downward part of a field of view (downward part of the vehicle body) when the traveling mode display device 46 is viewed from a front, as illustrated by an arrow A3 of FIGS. 5 and 8. This moving direction matches the downward part of the field of view (rear side of the vehicle body) when the toggle switch 36 is looked down at from above and captured in the field of view.

On the other hand, the traveling mode display device 46 moves the indicator 47 to a fourth direction corresponding to the second direction and opposite to the third direction whenever the toggle switch 36 accepts the operation to the second direction. The display positions of the indicator 47 move to positions on and under each character string corresponding to each of the off-road mode, the EV mode, the normal mode, the sport mode, and the towing mode with the above-described movement.

The moving direction (fourth direction) of the indicator 47 when the toggle switch 36 is operated to the second direction corresponds to an upward part of the field of view (upward part of the vehicle body) when the traveling mode display device 46 is viewed from the front, as illustrated by an arrow A4 of FIGS. 5 and 8. This moving direction matches the upward part of the field of view (front side of the vehicle body) when the toggle switch 36 is looked down at from above.

In this way, the operation direction of the toggle switch 36 when in sight is designed to match the moving direction of the indicator 47 when the traveling mode display device 46 is within the field of view. This enables the driver to provide a more intuitive operational feeling.

The second display 50 is configured with, for example, a touch panel type liquid crystal panel or organic EL panel and configured to change a display content on the basis of an occupant's touch operation and an operation to the commander switch 38. For example, as a screen on which the display content is changed in response to the operation to the commander switch 38, the second display 50 can display a home screen 60 that can transition to a setting screen 70 of the motor vehicle 1.

Figure 6A:
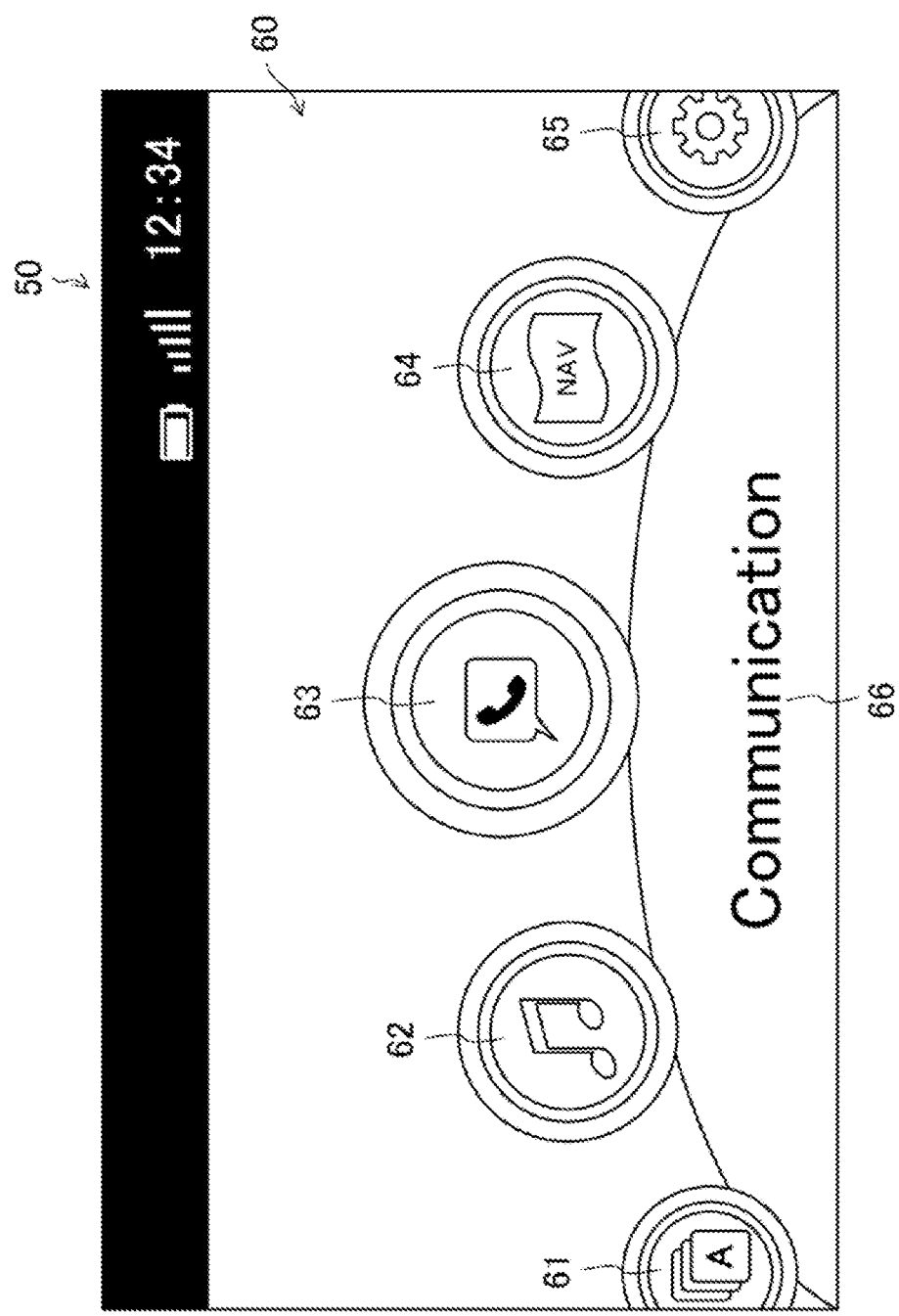
FIG. 6A is a diagram illustrating a home screen of a second display.

FIG. 6A illustrates the home screen 60 for the second display 50 of the motor vehicle 1. As illustrated in FIG. 6A, on this home screen 60, a first button 61, a second button 62, a third button 63, a fourth button 64, and a fifth button 65 are displayed in sequence from the left side of the screen (left side of the field of view when the home screen 60 is viewed from the front).

Here, the first button 61 is a Graphical User Interface (GUI) for transitioning to any of various kinds of application screens (not illustrated). The second button 62 is a GUI for transitioning to an entertainment screen (not illustrated). The third button 63 is a GUI for transitioning to a communication screen (not illustrated). The fourth button 64 is a GUI for transitioning to a navigation screen (not illustrated). The fifth button 65 is a GUI for transitioning to the setting screen 70.

The first button 61 to the fifth button 65 can be selected by rotating the commander switch 38. A character string 66 indicating the currently selected button is displayed on the lower side of the home screen 60. By depressing the commander knob 38*a* in a state of selecting the desired button, the home screen 60 can transition to the screen corresponding to each button.

While the first button 61 to the fifth button 65 are displayed in sequence from the left side to the right side of the screen of the second display 50, a manner to display the buttons is not limited to that illustrated in FIG. 6A. For example, like the setting screen 70 illustrated in FIG. 6B, to be described later, a setting item corresponding to the first button 61, a setting item corresponding to the second button 62, a setting item corresponding to the third button 63, a setting item corresponding to the fourth button 64, and a setting item corresponding to the fifth button 65 may be displayed in sequence from an upper side to a lower side of the screen. In this case, the setting items can be selected in sequence from the upper side of the screen by rotating the commander switch 38.

Figure 6B:
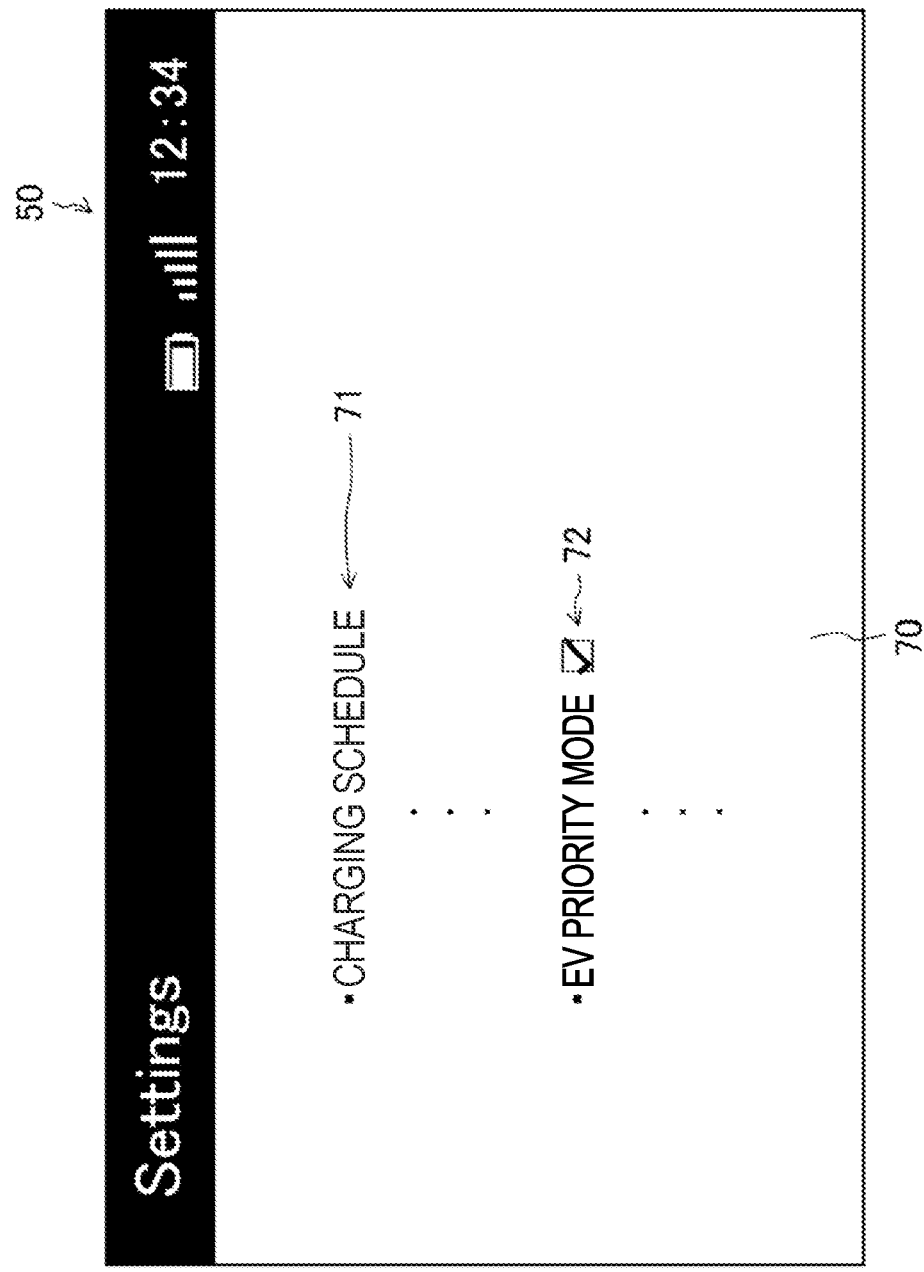
FIG. 6B is a diagram illustrating a setting screen of the second display.

FIG. 6B illustrates the setting screen 70 of the second display 50. As illustrated by FIG. 6B, for example, a first setting item 71 indicating "charging schedule" and a second setting item 72 indicating "EV priority mode" are displayed on this setting screen 70.

The first setting item 71 is selected by operating the commander switch 38, and the EV priority mode is turned on by pressing the commander knob 38a in that state (for example, a check box is checked as illustrated in FIG. 6B). When the EV priority mode is on, the controller 20 preferentially selects the EV mode over the normal mode during startup of the motor vehicle 1.

In this way, the commander switch 38 according to the present embodiment functions as the startup mode setting device that can set the EV mode to be selected during the startup of the motor vehicle 1 (during vehicle startup).

(Device in Control System)

Figure 7:
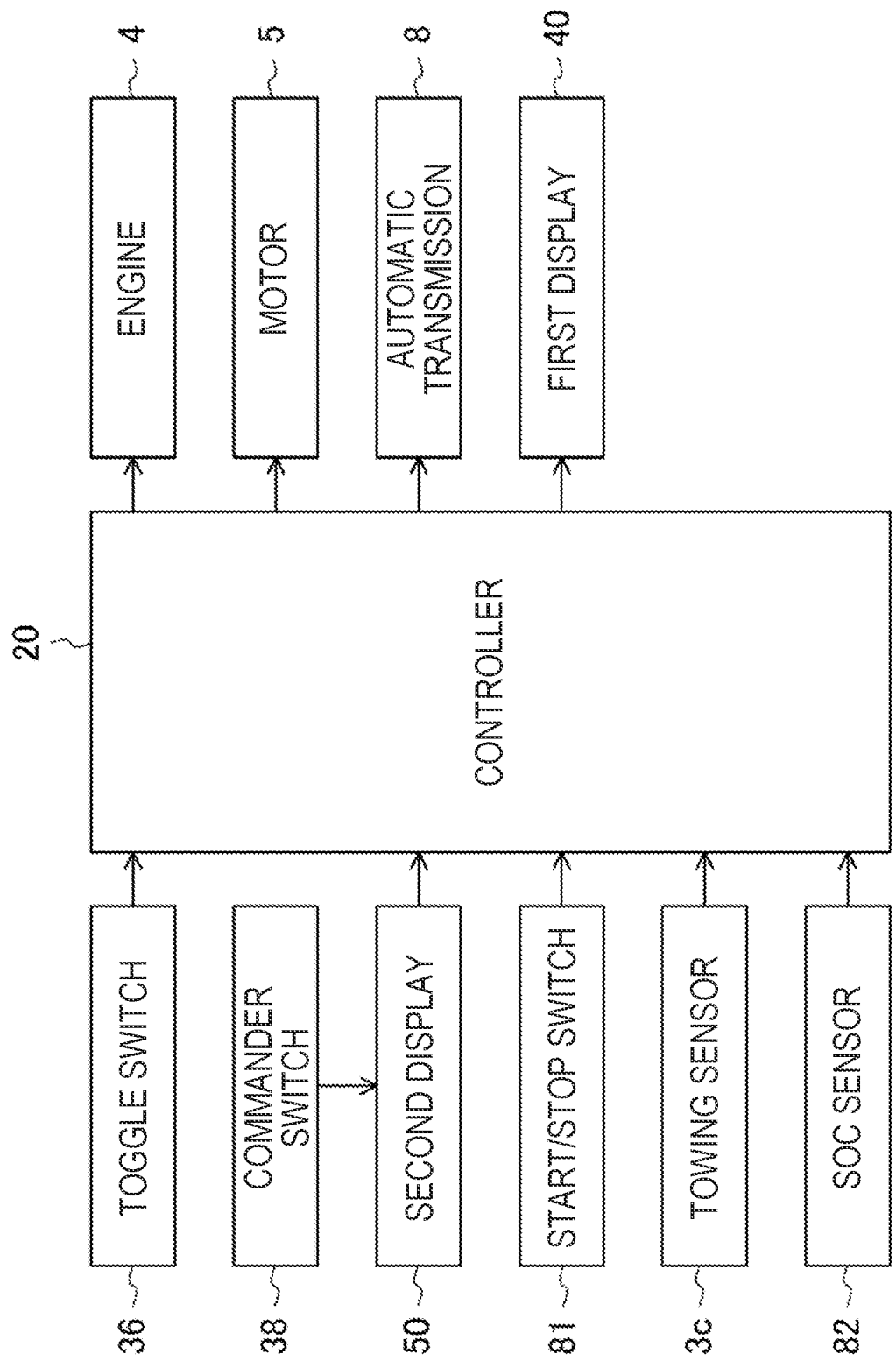
FIG. 7 is a block diagram of a hybrid vehicle system.

FIG. 7 is a block diagram of the hybrid vehicle system. The controller 20 that controls the engine 4, the motor 5, the automatic transmission 8, the first display 40, and the like in response to a driver's operation is set to the motor vehicle 1. The hybrid vehicle system is provided with this controller 20. The controller 20 is configured with hardware such as a processor, memory, and an interface and software such as a database and a control program.

It is noted that while one controller 20 is illustrated in the hybrid vehicle system of FIG. 7, the controller 20 of the control system may be divided into a device (PCM (powertrain control module)) mainly controlling actuation of the drive sources (the engine 4 and the motor 5) and a device (TCM (transmission control module)) mainly controlling actuation of the automatic transmission 8. The PCM and the TCM are connected by the CAN 13 and configured to be capable of electrically communicating with each other.

It is noted that a device controlling the second display 50 may be also divided into the PCM and the TCM. For example, the second display 50 itself may have a processor, memory, an interface, and the like. The second display 50 may be a tablet terminal independent of the motor vehicle 1.

The hybrid vehicle system includes switches that accept driver's operations. As those switches, this hybrid vehicle system has a START/STOP switch 81 as well as the toggle switch 36 and the commander switch 38 described above. The START/STOP switch 81 is a switch operated when the motor vehicle 1 is started up or stopped. Signals in response to driver's operations are input to the controller 20 using these switches.

It is noted that the commander switch 38 may be used to input a signal to the controller 20 via the second display 50 as illustrated in FIG. 7 or without via the second display 50.

The hybrid vehicle system also includes sensors measuring various parameters related to the motor vehicle 1. As those sensors, this hybrid vehicle system has an SOC sensor 82 in addition to the towing sensor 3c described above. This SOC sensor 82 detects an SOC (State of Charge) indicating a state of charge of the high-voltage battery 9. These sensors input detection signals to the controller 20.

The controller 20 can control the motor vehicle 1 to be started up or stopped and the motor vehicle 1 to run when the motor vehicle 1 is not stopped on the basis of the signals input from these switches and sensors.

Specifically, the controller 20 according to the present embodiment selects one of the plurality of traveling modes on the basis of the operation accepted by the toggle switch 36 as the operation device. The controller 20 controls the devices in the drivetrain to realize the traveling mode selected in that way.

More specifically, the controller 20 according to the present embodiment selects one of the plurality of traveling modes in sequence in accordance with a predetermined order of selection whenever the toggle switch 36 accepts the operation to each of the first direction (vehicle rear direction) and the second direction (vehicle front direction).

At that time, the controller 20 preferentially selects the normal mode over the EV mode (controls the normal mode to be set as the starting point) during the vehicle startup when the commander switch 38 serving as the startup mode setting device does not make any settings. More specifically, when it is not set to select the towing mode during non-setting by the commander switch 38 and the vehicle startup, the controller 20 selects the normal mode as the traveling mode during the vehicle startup.

The normal mode is then set to be changed to different traveling modes between when the toggle switch 36 accepts the one or plurality of operations to the first direction and when the toggle switch 36 accepts the one or plurality of operations to the second direction. In other words, it is set such that the traveling mode (EV mode or off-road mode) selected when the toggle switch 36 is operated to the first direction in the normal mode differs from the traveling mode (sport mode or towing mode) selected when the toggle switch 36 is operated to the second direction in the normal mode.

For example, when the toggle switch 36 is operated to the first direction in a state of selecting the normal mode, the controller 20 switches the traveling modes to the EV mode and the off-road mode in sequence.

On the other hand, when the toggle switch 36 is operated to the second direction in the state of selecting the normal mode, the controller 20 switches the traveling modes to the sport mode and the towing mode in sequence.

Furthermore, when the commander switch 38 serving as the startup mode setting device make settings (when the check box of the second setting item 72 illustrated in FIG. 6B is checked), the controller 20 preferentially selects the EV mode over the normal mode (controls the EV mode to be set as a starting point) during the vehicle startup. More specifically, when it is not set to select the towing mode during settings by the commander switch 38 and the vehicle startup, the controller 20 selects the EV mode as the traveling mode during the vehicle startup.

For example, when the toggle switch 36 is operated to the first direction in a state of selecting the EV mode, the controller 20 switches the traveling modes from the EV mode to the off-road mode.

On the other hand, when the toggle switch 36 is operated to the second direction in the state of selecting the EV mode, the controller 20 switches the traveling modes to the normal mode, the sport mode, and the towing mode in sequence.

Furthermore, when it is set to select the towing mode during the vehicle startup, the controller 20 selects the towing mode as the traveling mode during the vehicle startup. Additionally, when the motor vehicle 1 is on the run, the controller 20 is configured to switch the currently selected traveling mode, as the starting point, to the other traveling modes in sequence.

That is, in the present embodiment, the controller 20 switches among the plurality of traveling modes from the sport mode to the normal mode, from the normal mode to the EV mode, or from the EV mode to the off-road mode when the toggle switch 36 accepts the operation to the first direction.

Likewise, the controller 20 switches among the plurality of traveling modes in sequence from the off-road mode to the EV mode, from the EV mode to the normal mode, from the normal mode to the sport mode, or from the sport mode to the towing mode when the toggle switch 36 accepts the operation to the second direction.

In this way, the off-road mode as the fourth mode is selected when the toggle switch 36 accepts one operation to the first direction in the EV mode. Likewise, the towing mode as the fourth mode is selected when the toggle switch 36 accepts one operation to the second direction in the sport mode.

Furthermore, the display content of the traveling mode display device 46 changes with the switching among the traveling modes via the toggle switch 36. For example, the controller 20 preferentially selects the normal mode over the EV mode (controls the normal mode to be set as the starting point) during the vehicle startup when the commander switch 38 serving as the startup mode setting device does not make any settings, as described above. In this case, the traveling mode display device 46 displays a content illustrated in an upper part of FIG. 8.

When the toggle switch 36 accepts one operation to the first direction (vehicle rear direction) in the normal mode, the controller 20 switches the traveling mode from the normal mode to the EV mode. The display content of the traveling mode display device 46 transitions from the upper part to a lower part of FIG. 8 with the switching. Through this transition, the indicator 47 moves in the third direction (refer to the arrow A3) by one stage (by one traveling mode).

Subsequently, when the toggle switch 36 accepts one operation to the first direction in the EV, the controller 20 switches the traveling mode from the EV mode to the off-road mode. On the contrary, when the toggle switch 36 accepts one operation to the second direction in the EV mode, the controller 20 returns the traveling mode from the EV mode to the normal mode.

Setting the normal mode and the EV mode to be continuous in the order of selection as described above can realize the switching among the traveling modes as follows. That is, when the toggle switch 36 accepts one operation to the first direction in the normal mode, the controller 20 switches the normal mode to the EV mode. In addition, when the toggle switch 36 accepts one operation to the second direction in the EV mode, the controller 20 switches the EV mode to the normal mode.

In this way, the normal mode and the EV mode according to the present embodiment are set to be continuous in the order of selection by the controller 20.

More specifically, the normal mode and the EV mode are set to be switched to each other by one operation to the toggle switch 36. A selection position of the normal mode and that of the EV mode in the traveling mode display device 46 are set to be adjacent in the moving direction (third direction or fourth direction) of the indicator 47 to correspond to the setting.

Processes related to the selection of the traveling mode will be described hereinafter.

(Processes Related to Selection of Traveling Mode)

Figure 9A:
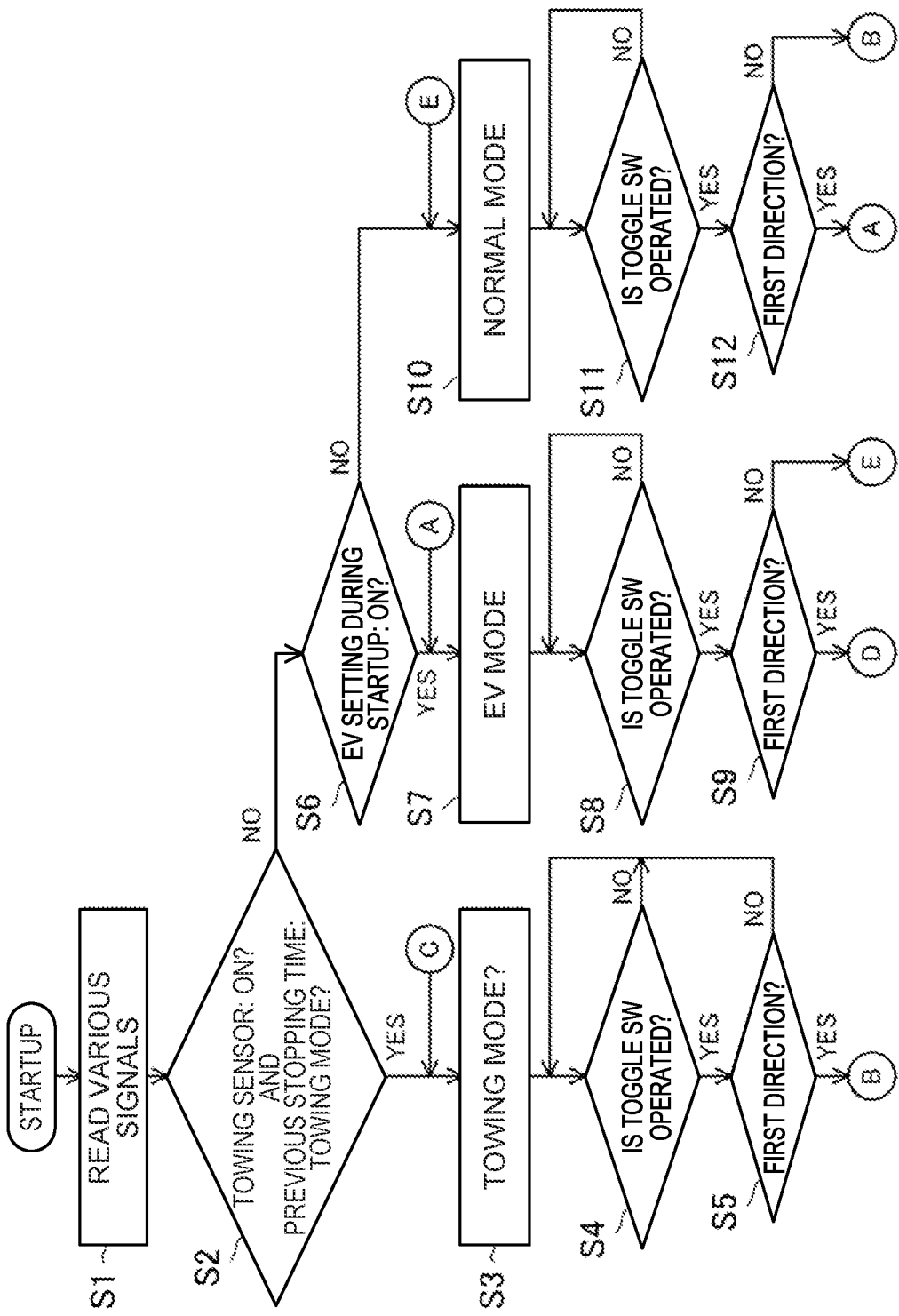
FIG. 9A is a flowchart illustrating processes related to selection of a traveling mode.
Figure 9B:
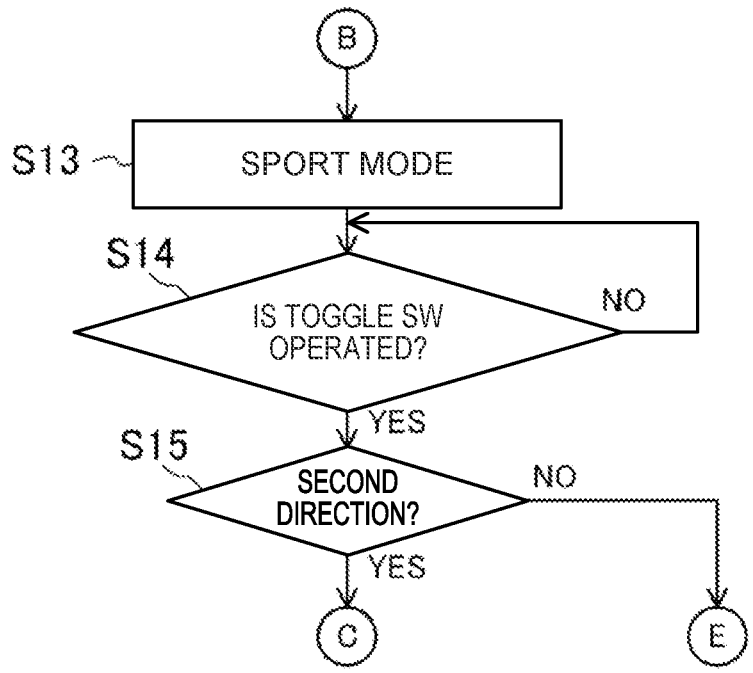
FIG. 9B is a flowchart illustrating processes related to the selection of a traveling mode.
Figure 9C:
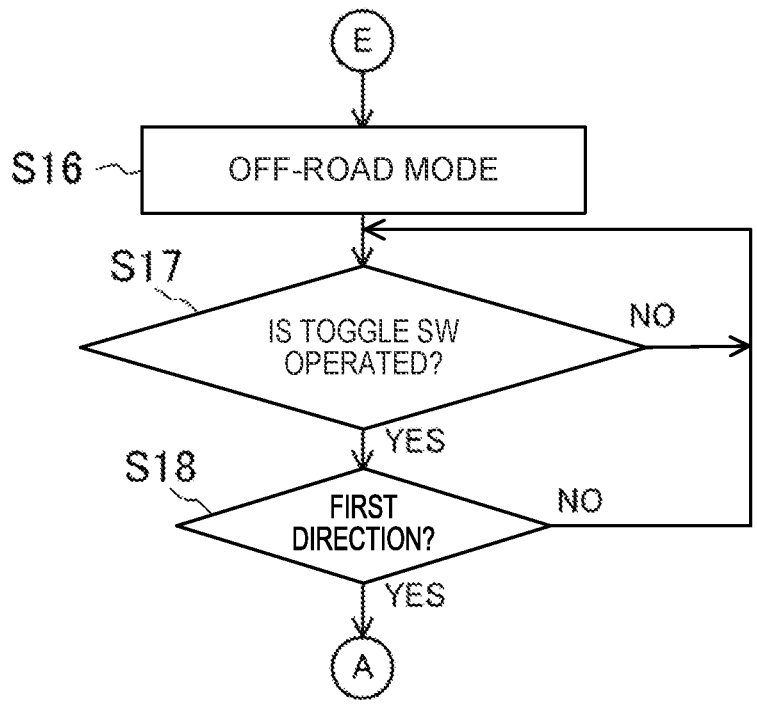
FIG. 9C is a flowchart illustrating processes related to the selection of a traveling mode.

FIGS. 9A, 9B, and 9C are flowcharts each illustrating processes related to the selection of the traveling mode. When the motor vehicle 1 is started up, the controller 20 goes to a control process in Step S1 of FIG. 9A. In this Step S1, the controller 20 reads electrical signals from the various sensors and switches.

In subsequent Step S2, the controller 20 determines whether the towing sensor 3c outputs an ON signal and whether the towing mode was selected during previous stopping. When a determination result of Step S2 is Yes, the controller 20 goes to a control process in Step S3. On the other hand, when the determination result of Step S2 is NO, the controller 20 goes to a control process in Step S6.

In Step S3, the controller 20 selects the towing mode as the traveling mode. Subsequent Step S4 is a process determined during traveling in the towing mode.

Specifically, in Step S4, the controller 20 determines whether the toggle switch 36 accepted one operation. When this determination result is NO, that is, when the toggle switch 36 is not operated during traveling in the towing mode, the controller 20 returns to the control process in Step S4. In this case, the controller 20 controls the motor vehicle 1 to continue traveling in the towing mode. On the other hand, when the determination result of Step S4 is YES, that is, when the toggle switch 36 accepted the operation during traveling in the towing mode, the controller 20 goes to a control process in Step S5.

In Step S5, the controller 20 determines the operation direction of the toggle switch 36. When the operation direction is the first direction (vehicle rear direction) (Step S5: YES), the controller 20 goes to a control process in Step S13 of FIG. 9B.

On the other hand, when the operation direction of the toggle switch 36 is the second direction (vehicle front direction) in Step S5 (Step S5: NO), the controller 20 returns to the control process in Step S4. That is, when the toggle switch 36 is operated to the second direction in the towing mode, the traveling mode is not switched.

In Step S13 of FIG. 9B, the controller 20 selects the sport mode as the traveling mode. Subsequent Step S14 is a process determined during traveling in the sport mode.

Specifically, in Step S14, the controller 20 determines whether the toggle switch 36 accepted one operation. When this determination result is NO, that is, when the toggle switch 36 is not operated during traveling in the sport mode, the controller 20 returns to the control process in Step S14. In this case, the controller 20 controls the motor vehicle 1 to continue traveling in the sport mode. On the other hand, when the determination result of Step S14 is YES, that is, when the toggle switch 36 accepted the operation during traveling in the sport mode, the controller 20 goes to a control process in Step S15.

In Step S15, the controller 20 determines the operation direction of the toggle switch 36. When the determined operation direction is the second direction (Step S15: YES), the controller 20 returns to the control process in Step S3 described above. The motor vehicle 1 returns from traveling in the sport mode to traveling in the towing mode.

On the other hand, when the operation direction determined in Step S15 is the first direction (Step S15: NO), the controller 20 goes to a control process in Step S10 of FIG. 9A. In this case, the controller 20 selects the normal mode and the traveling in the normal mode is performed, as described later.

On the other hand, in Step S6 to which the controller 20 goes when the determination result of Step S2 is NO, the controller 20 determines whether it is set to select the EV mode during the vehicle startup on the basis of the operation accepted by the commander knob 38a in advance. When this determination result is NO (when the commander knob 38a makes no settings), the controller 20 goes to a control process in Step S10. In this case, the controller 20 preferentially selects the normal mode over the EV mode during the vehicle startup, as described later.

When the determination result of Step S6 is YES (when the commander knob 38a makes settings), the controller 20 goes to a control process in Step S7. In this case, the controller 20 preferentially selects the EV mode over the normal mode during the vehicle startup.

More specifically, in Step S7 subsequent to Step S6, the controller 20 selects the EV mode as the traveling mode. Subsequent Step S8 is a process determined during traveling in the EV mode.

Specifically, in Step S8, the controller 20 determines whether the toggle switch 36 accepted one operation. When this determination result is NO, that is, when the toggle switch 36 is not operated during traveling in the EV mode, the controller 20 returns to the control process in Step S8. In this case, the controller 20 controls the motor vehicle 1 to continue traveling in the EV mode. On the other hand, when the determination result of Step S8 is YES, that is, when the toggle switch 36 accepted the operation during traveling in the EV mode, the controller 20 goes to a control process in Step S9.

In Step S9, the controller 20 determines the operation direction of the toggle switch 36. When the determined operation direction is the first direction (Step S9: YES), the controller 20 goes to a control process in Step S16 of FIG. 9C. In this case, the motor vehicle 1 returns to traveling in the off-road mode from the traveling in the EV mode.

On the other hand, when the operation direction determined in Step S9 is the second direction (Step S9: NO), the controller 20 goes to the control process in Step S10 of FIG. 9A. In this case, the controller 20 selects the normal mode and the traveling in the normal mode is performed, as described later.

In Step S16 of FIG. 9C, the controller 20 selects the off-road mode as the traveling mode. Subsequent Step S17 is a process determined during traveling in the off-road mode.

Specifically, in Step S17, the controller 20 determines whether the toggle switch 36 accepted one operation. When this determination result is NO, that is, when the toggle switch 36 is not operated during traveling in the off-road mode, the controller 20 repeats the control process in Step S17. In this case, the controller 20 controls the motor vehicle 1 to continue traveling in the off-road mode. On the other hand, when the determination result of Step S17 is YES, that is, when the toggle switch 36 accepted the operation during traveling in the off-road mode, the controller 20 goes to a control process in Step S18.

In Step S18, the controller 20 determines the operation direction of the toggle switch 36. When the determined operation direction is the first direction (Step S18: YES), the controller 20 returns to the control process in Step S7 of FIG. 9A. In this case, the motor vehicle 1 returns from traveling in the off-road mode to traveling in the EV mode.

On the other hand, when the operation direction determined in Step S18 is the second direction (Step S18: NO), the controller 20 returns to the control process in Step S17 of FIG. 9C. That is, when the toggle switch 36 is operated to the first direction in the off-road mode, the traveling mode is not switched.

Furthermore, in Step S10 to which the controller 20 goes when the determination result of Step S6 is NO, when the determination result of Step S9 is NO, or when the determination result of Step S15 is NO, the controller 20 selects the normal mode as the traveling mode. Subsequent Step S11 is a process determined during traveling in the normal mode.

Specifically, in Step S11, the controller 20 determines whether the toggle switch 36 accepted one operation. When this determination result is NO, that is, when the toggle switch 36 is not operated during traveling in the off-road mode, the controller 20 repeats the control process in Step S11. In this case, the controller 20 controls the motor vehicle 1 to continue traveling in the normal mode. On the other hand, when the determination result of Step S11 is YES, that is, when the toggle switch 36 accepted the operation during traveling in the normal mode, the controller 20 goes to a control process in Step S12.

In Step S12, the controller 20 determines the operation direction of the toggle switch 36. When the determined operation direction is the first direction (Step S12: YES), the controller 20 goes to the control process in Step S7 described above. In this case, the traveling mode is switched from the normal mode to the EV mode.

On the other hand, when the operation direction determined in Step S12 is the second direction (Step S12: NO), the controller 20 goes to the control process in Step S13 described above. That is, when the toggle switch 36 is operated to the second direction in the normal mode, the traveling mode is switched from the normal mode to the sport mode.

(Order of Selection of Traveling Modes)

As described so far, in the present embodiment, the one or plurality of operations to the toggle switch 36 serving as the operation device can switch the HEV mode to one of the three or more other traveling modes. The use of the toggle switch 36 can achieve the switching to each mode without compromising the operability even when four or more traveling modes are set.

Furthermore, as illustrated in FIG. 8, when the toggle switch 36 accepts the operation to one of the first and second directions, the traveling mode is switched from the HEV mode to the EV mode. When the toggle switch 36 accepts the operation to the other direction, the traveling mode is switched from the EV mode to the HEV mode. In this way, one operation (single operation) on the toggle switch 36 enables mutual transition between the HEV mode and the EV mode. Concerning the switching between the modes, which are estimated to be higher in a frequently of selection than the other traveling modes, the operability during this switching can be improved.

Furthermore, as illustrated in FIGS. 8 and 9A to 9C, the sport mode is selected when the toggle switch 36 accepts the single operation in the HEV mode. On the other hand, the towing mode or the off-road mode as the fourth mode is selected when the toggle switch 36 accepts two operations in the HEV mode.

In this way, by setting the number of operations for switching from the HEV mode different depending on the traveling mode, it is possible to set so that the switching from the HEV mode to the sport mode, which is estimated to be high in the frequency of selection similarly to the EV mode, is performed immediately and that the fourth mode, which is estimated to be low in the frequency of selection, is not selected by the single operation. This is advantageous in improving the operability during the switching among the modes.

That is, configuring the operation device from the toggle switch 36 can set the different number of operations required for the selection, depending on the frequency of selection of each traveling mode. This can realize smoother switching for the traveling modes with a high frequency of selection while inhibiting a selection error resulting from a malfunction for the traveling modes with a low frequency of selection. This is advantageous in improving the operability of the operation device.

Furthermore, as illustrated in FIG. 4, the use of the commander switch 38 as the startup mode setting device can realize the startup from the EV mode without setting the HEV mode as the starting point during the vehicle startup. This enables more flexible settings in response to a driver's request.

Moreover, as illustrated in FIG. 4, the commander switch 38 is disposed more proximate to the toggle switch 36 than the steering wheel 31, the first display 40, and the second display 50. Disposing the commander switch 38 proximate to the toggle switch 36 can improve the operability during settings by the commander switch 38 during the vehicle startup.

Other Embodiments

At least part of the present disclosure is also applicable to a two-wheel drive vehicle.

In addition, a display manner of the traveling mode display device 46 is not limited to that illustrated in FIG. 5. For example, the currently selected traveling mode may be displayed on the first display 40 by displaying the traveling mode in a reel and rotating the reel in response to the operation direction of the toggle switch 36.

In addition, a display manner of the second meter display device 42 is not limited to that illustrated in FIG. 5. For example, the first display 40 may temporarily display the traveling mode display device 46 during operating the toggle switch 36.

Figure 10B:
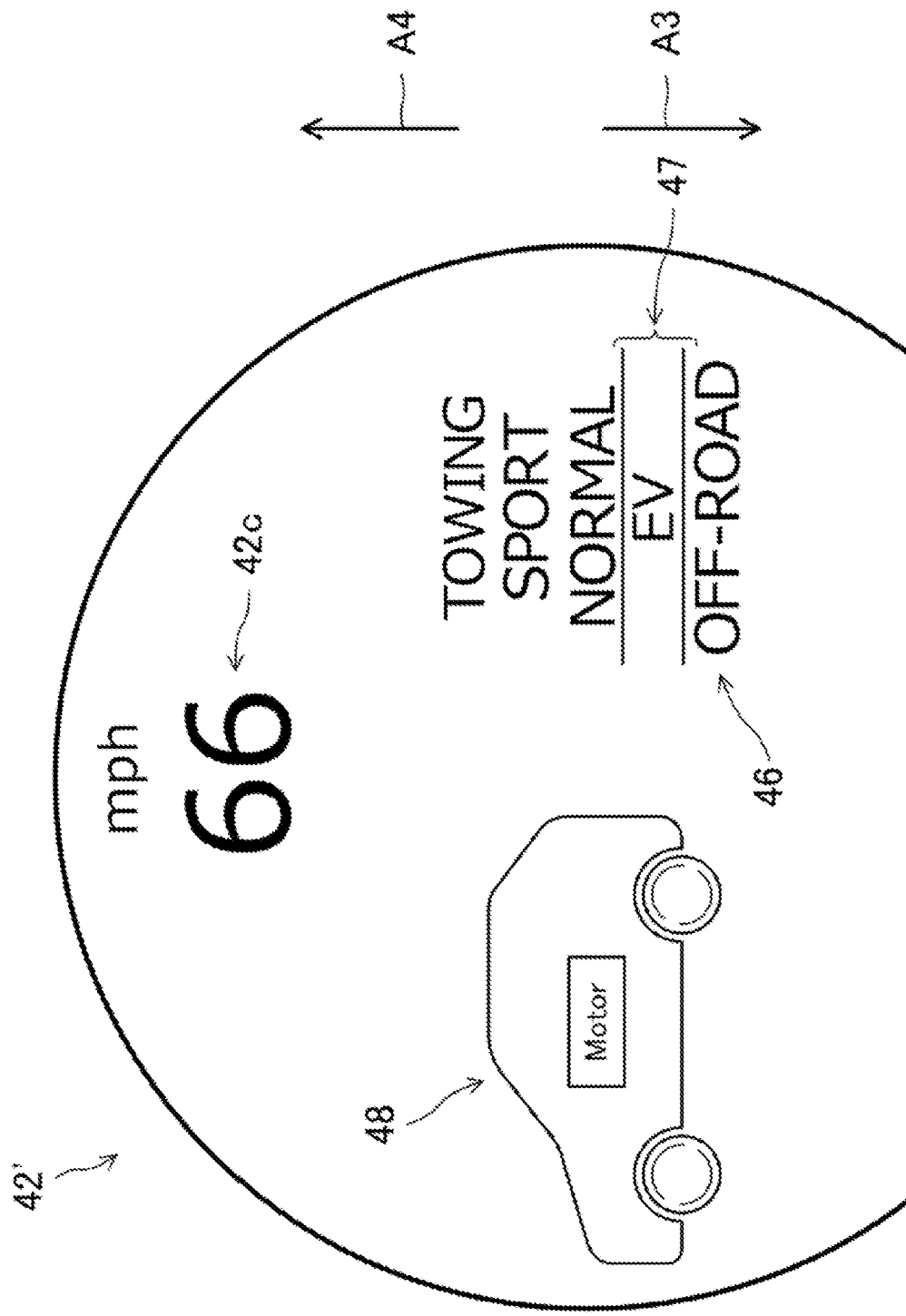
FIG. 10B is a diagram illustrating a modification of the second meter display device and corresponding to FIG. 5.
Figure 10C:
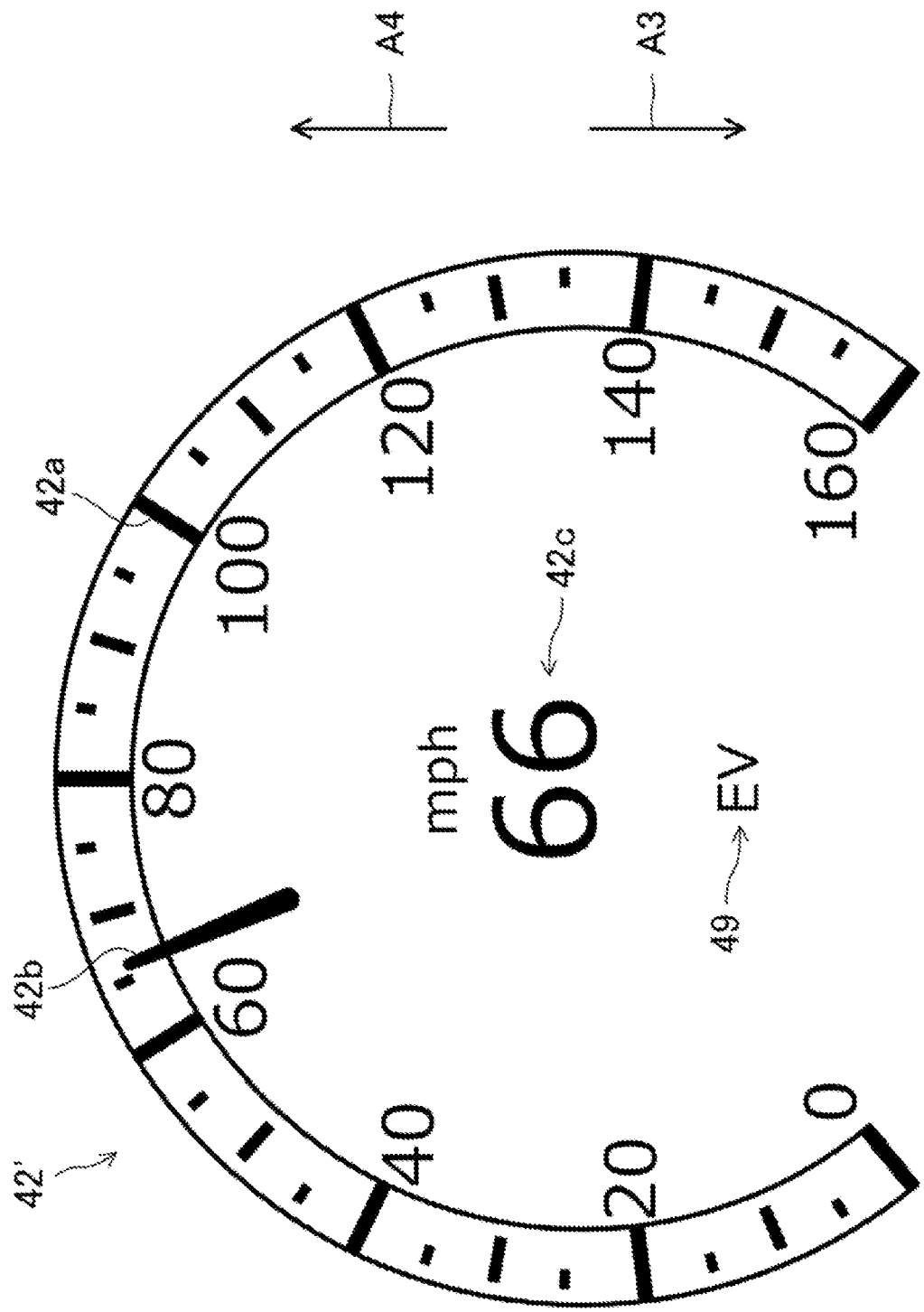
FIG. 10C is a diagram illustrating a modification of the second meter display device and corresponding to FIG. 5.

FIGS. 10A, 10B, and 10C are diagrams each illustrating a modification of the second meter display device 42 and corresponding to FIG. 5. It is assumed herein that the toggle switch 36 is operated during traveling in the normal mode and the normal mode is switched to the EV mode.

A second meter display device 42' according to the modification displays velocity information 42c indicating a velocity of the motor vehicle 1 as an alternative to displaying the traveling mode display device 46 while the motor vehicle 1 is on the run (for example, during traveling in the normal mode) (refer to FIG. 10A). In this way, the second meter display device 42' hides the traveling mode display device 46 while the motor vehicle 1 is on the run.

Subsequently, when the toggle switch 36 is operated while the motor vehicle 1 is on the run, the second meter display device 42' changes a display position of the vehicle information 42c to a screen upper side position and additionally displays the traveling mode display device 46 and a vehicle image 48 representing the traveling mode selected via the toggle switch 36 (refer to FIG. 10B). At that time, the second meter display device 42' may hide the scale image 42a and the indicator needle image 42b, as illustrated in FIG. 10B.

For example, when the EV mode is selected during traveling in the normal mode, the traveling mode display device 46 in which the indicator 47 is moved to a position of the character string "EV" and the vehicle image 48 representing the EV mode are displayed on the second meter display device 42'. Here, on the second meter display device 42', the vehicle image 48 may have a different color per traveling mode, and a conceptual image characterizing each traveling mode such as a conceptual image of the towing mode (for example, a conceptual image of FIG. 1) may be displayed as the vehicle image 48.

It is noted that the toggle switch 36 may be further operated during display of the traveling mode display device 46 and the vehicle image 48 so that a display position of the indicator 47 and a display content of the vehicle image 48 can be changed on the basis of the traveling mode selected by the operation.

Subsequently, after the passage of a predetermined period of time (for example, a few seconds) since the toggle switch 36 is operated, the second meter display device 42' returns the display position of the vehicle information 42c to the position before the change and hides the traveling mode display device 46 and the vehicle image 48 (refer to FIG. 10C). Moreover, the second meter display device 42' displays the scale image 42a and the indicator needle image 42b again, and additionally displays a character string 49 "EV" indicating that the EV mode is selected on a side below the velocity information 42c of the screen.

In this way, display manners of the first display 40, the second meter display device 42, and the traveling mode display device 46 can be changed as appropriate.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Motor vehicle (vehicle, hybrid vehicle)
20 Controller
35 Select lever (shift lever)
36 Toggle switch (operation device)
38 Commander switch (startup mode setting device)
4 Engine
5 Motor
52 Steering angle sensor
55 Engine revolution sensor
56 Motor speed sensor
40 First display
47 Indicator
50 Second display
A1 First direction
A2 Second direction
A3 Third direction
A4 Fourth direction

The invention claimed is:

1. A hybrid vehicle system configured to be capable of switching among four or more of a plurality of traveling modes including a hybrid electric vehicle (HEV) mode in which an engine and a motor output traveling torque and an electric vehicle (EV) mode in which only the motor outputs the traveling torque, and comprising one operation device for selecting any one of the plurality of traveling modes, the hybrid vehicle system comprising:
   a controller electrically connected to the operation device, wherein
   the operation device is configured by a toggle switch that accepts one or a plurality of operations to a predetermined first direction and one or a plurality of operations to a second direction different from the first direction, and configured to output a signal corresponding to each operation to the controller;
   the controller selects the plurality of traveling modes in sequence whenever the operation device accepts each of the operations to the first direction and the second direction;
   the HEV mode is set to be changed to different traveling modes between when the operation device accepts the one or plurality of operations to the first direction and when the operation device accepts the one or plurality of operations to the second direction; and
   the HEV mode and the EV mode are set to be continuous in an order of selection by the controller.

2. The hybrid vehicle system according to claim 1, wherein the plurality of traveling modes further include a sport mode and a fourth mode,
the plurality of traveling modes are switched by the controller in sequence to:
change the sport mode to the HEV mode or the HEV mode to the EV mode when the operation device accepts the operation to the first direction, and
change the EV mode to the HEV mode or the HEV mode to the sport mode when the operation device accepts the operation to the second direction, and
the fourth mode is selected by the controller when the operation device accepts the operation to the first direction in the EV mode or when the operation device accepts the operation to the second direction in the sport mode.

3. The hybrid vehicle system according to claim 2, further comprising:
a startup mode setting device that is configured as a separate component from the toggle switch and that can set the EV mode to be selected during vehicle startup, wherein
the controller preferentially selects:
the HEV mode over the EV mode during the vehicle startup when the startup mode setting device does not make any settings, and
the EV mode over the HEV mode during the vehicle startup when the startup mode setting device makes settings.

4. The hybrid vehicle system according to claim 3, wherein the startup mode setting device is adjacent to the toggle switch across a shift lever.

5. The hybrid vehicle system according to claim 1, further comprising:
a startup mode setting device that is configured as a separate component from the toggle switch and that can set the EV mode to be selected during vehicle startup, wherein
the controller preferentially selects:
the HEV mode over the EV mode during the vehicle startup when the startup mode setting device does not make any settings, and
the EV mode over the HEV mode during the vehicle startup when the startup mode setting device makes settings.

6. The hybrid vehicle system according to claim 5, wherein the startup mode setting device is adjacent to the toggle switch across a shift lever.

* * * * *